(12) United States Patent
Eliasson

(10) Patent No.: US 7,465,341 B2
(45) Date of Patent: *Dec. 16, 2008

(54) APPARATUS FOR CLEANING OF A GAS

(75) Inventor: Thomas Eliasson, Älvsjö (SE)

(73) Assignee: Alfa Laval Corporate AB, Lund (SE)

( * ) Notice: Subject to any disclaimer, the term of this patent is extended or adjusted under 35 U.S.C. 154(b) by 122 days.

This patent is subject to a terminal disclaimer.

(21) Appl. No.: 10/551,531

(22) PCT Filed: Mar. 18, 2004

(86) PCT No.: PCT/SE2004/000401

§ 371 (c)(1),
(2), (4) Date: Sep. 26, 2006

(87) PCT Pub. No.: WO2004/091799

PCT Pub. Date: Oct. 28, 2004

(65) Prior Publication Data

US 2007/0163444 A1 Jul. 19, 2007

(30) Foreign Application Priority Data

Apr. 16, 2003 (SE) .................................. 0301140
Sep. 16, 2003 (SE) .................................. 0302463

(51) Int. Cl.
*B01D 47/00* (2006.01)
(52) U.S. Cl. .......................................... 96/281; 55/406
(58) Field of Classification Search .................. 55/400, 55/406, 407, 423, 424, 426, 434; 96/281; 95/270; 123/572–574
See application file for complete search history.

(56) References Cited

U.S. PATENT DOCUMENTS

| | | | | |
|---|---|---|---|---|
| 2,507,897 | A * | 5/1950 | Gavagnin | 96/318 |
| 5,564,401 | A * | 10/1996 | Dickson | 123/573 |
| 6,152,120 | A * | 11/2000 | Julazadeh | 123/572 |
| 6,973,925 | B2 * | 12/2005 | Sauter et al. | 123/572 |
| 7,022,163 | B2 * | 4/2006 | Olsson et al. | 95/268 |
| 7,338,546 | B2 * | 3/2008 | Eliasson et al. | 55/406 |
| 2005/0198932 | A1 * | 9/2005 | Franzen et al. | 55/406 |

FOREIGN PATENT DOCUMENTS

WO WO 01/00969 A1 1/2001

* cited by examiner

Primary Examiner—Duane Smith
Assistant Examiner—Sonji Turner
(74) Attorney, Agent, or Firm—Michaud-Duffy Group LLP

(57) ABSTRACT

In an apparatus for cleaning of a gas a centrifugal rotor is rotatable in a separation chamber about a vertical rotational axis (R). The centrifugal rotor is rotatable by means of a turbine wheel arranged in a drive chamber situated below the separation chamber. The centrifugal rotor and the turbine wheel are connected with each other by means of a shaft. The separation chamber and the drive chamber are separated from each other by two partitions, through which the shaft extends and which between themselves form a drainage chamber. A nozzle is arranged to spray a liquid against the turbine wheel in the drive chamber for rotation thereof and of the centrifugal rotor. The drainage chamber has an outlet for draining of liquid having entered the drainage chamber from the drive chamber, so that liquid shall not be able to flow from the drive chamber to the separation chamber.

8 Claims, 1 Drawing Sheet

APPARATUS FOR CLEANING OF A GAS

The present invention relates to an apparatus for cleaning of a gas. Particularly, the invention concerns an apparatus of this kind comprising

- a housing, which delimits a separation chamber having a gas inlet for gas to be cleaned and a gas outlet for cleaned gas,
- a centrifugal rotor, which is arranged to rotate about a substantially vertical rotational axis in the separation chamber and to entrain in its rotation gas to be cleaned,
- a drive shaft for rotation of the centrifugal rotor, which drive shaft extends downwardly from the centrifugal rotor through a bottom of the separation chamber and into a drive chamber situated below said bottom, and
- a driving device for rotation of the drive shaft and thereby the centrifugal rotor, said driving device being arranged to generate one or more sprays of a liquid in the drive chamber for accomplishing said rotation of the drive shaft.

BACKGROUND OF THE INVENTION

An apparatus of this kind, described in the Swedish Patent Application No. 0202622.7, may be used for instance for cleaning of crankcase gas coming from an internal combustion engine. The centrifugal rotor may be driven for instance by means of pressurized lubricant coming from the same combustion engine, and the driving device may comprise a turbine member, which is supported by the drive shaft in the drive chamber, and a spray device, which is arranged to spray a liquid against the turbine member in the drive chamber for rotation of the drive shaft and thereby the centrifugal rotor.

For avoiding that pressurized liquid upon operation of an apparatus of this kind would unintentionally pass upwardly along the drive shaft from the drive chamber to the separation chamber and thereby deteriorate gas having been cleaned in the separation chamber but having not yet left it, a sealing device has to be arranged between the drive shaft and said bottom, through which the drive shaft extends. It has proved difficult, however, to get a sealing device to prevent completely transfer of liquid from the drive chamber to the separation chamber, particularly if a bearing is to be arranged between the drive shaft and said bottom.

SUMMARY OF THE INVENTION

The main object of the present invention is to provide a construction for an apparatus of the kind defined initially, by means of which unintentional transfer of pressurized driving liquid from the drive chamber to the separation chamber may be avoided without any sealing member having to be arranged in contact with both the rotatable drive shaft and the non-rotatable bottom of the separation chamber. One further object of the invention is that unintended liquid transfer of this kind should be avoided even after a sealing member of the just mentioned kind has in fact been used but been worn, so that it leaves a slot between the bottom of the separation chamber and the rotatable drive shaft.

These objects may be obtained according to the invention in a way such that said bottom delimits a drainage chamber in an area in which the drive shaft extends through the bottom, the drainage chamber being situated so that it will receive liquid unintentionally flowing upwardly from the drive chamber along the drive shaft, and that the drainage chamber has a liquid outlet for draining of liquid.

The drainage chamber may be formed in different ways by the bottom. Thus, the bottom may be formed in one piece by molding in such that it surrounds the drive shaft at a relatively small distance therefrom in two areas axially spaced from each other, but between these areas surrounds the drive shaft at a larger distance therefrom. However, according to a preferred embodiment of the invention the bottom comprises an upper wall and a lower wall, the draining chamber being delimited between the upper wall and the lower wall.

If a bearing is to be arranged between the drive shaft and the bottom, it is suitably arranged between the drive shaft and the lower wall.

The need of the present invention in an apparatus of the kind here in question is caused by the fact that the liquid used for driving of the centrifugal rotor is split to a large degree and forms together with air that is present a mist in the drive chamber. If a turbine member of the kind shown in SE 0202622.7 is used for the driving, particularly much liquid splash and mist will come up in the area where the drive shaft extends through said bottom. In an apparatus formed according to the invention liquid drops, which despite use of a sealing device are transferred from the drive chamber to the drainage chamber, will deposit on the walls of the latter and will coalesce there to a continuous liquid phase. Possibly, the drive shaft may carry an annular flange or the like in the drainage chamber, arranged to throw away from the drive shaft by its rotation liquid that is creeping upwards along the drive shaft.

Since a liquid mist is constantly present in the drive chamber during the operation of the apparatus, liquid should if possible be drained from the drainage chamber to a space other than the drive chamber. However, it may be possible to return liquid from the drainage chamber to a part of the drive chamber which is situated at a substantial distance from the turbine member, where the liquid mist is not too dense. The liquid may be returned to the lower part of the drive chamber, which constantly contains a volume of liquid, i.e. at a level below a liquid surface.

If, as in connection with the cleaning of crankcase gas, at least part of the particles from which the gas should be freed by means of the centrifugal rotor are in a liquid form, these liquid particles after they have been separated and been brought to coalesce to a continuous liquid phase on surfaces in the separation chamber may be allowed to run into the drainage chamber and from there further out through the liquid outlet of the latter. Apart from a first liquid inlet for liquid of this kind the drainage chamber may have a second liquid inlet for liquid that has gradually deposited on the inside of an outlet conduit, which is connected with the aforementioned gas outlet for clean gas. Liquid of this kind, even if an insignificant volume of such liquid is formed per unit of time, should be prevented from accumulating to a larger volume in the flow path of cleaned gas. If the outlet conduit for cleaned gas is directed upwardly or obliquely upwardly from the gas outlet of the separation chamber, drops of liquid formed on the inside of the outlet conduit may be brought to run to the second liquid inlet and into the drainage chamber.

Obtainment of the objective to avoid transfer of liquid from the drive chamber to the separation chamber is facilitated if the gas pressure prevailing in the separation chamber is higher than the gas pressure prevailing in the drive chamber. This can be accomplished by means of the centrifugal rotor in the separation chamber. In the most simple way it is accomplished by bringing the gas inlet of the separation chamber for gas to be cleaned to communicate directly with a central part of the interior of the centrifugal rotor and by bringing gas having been cleaned by the rotation of the centrifugal rotor flowing out of the centrifugal rotor to the separation chamber at a distance from the rotational axis of the centrifugal rotor, which is larger than the distance between the rotational axis and the inlet of the centrifugal rotor for uncleaned gas.

Upon use of a centrifugal rotor of this kind in an apparatus constructed in accordance with the invention it is possible to accomplish a gas pressure in the drainage chamber, which during the operation of the apparatus is maintained at a value between the values of the gas pressures in the separation chamber and the drive chamber, respectively. This requires that all the connections between the drainage chamber and the separation chamber and the drive chamber, respectively, are throttled to a degree such that no pressure equalization occurs between the three chambers during the operation of the apparatus. Such an arrangement effectively prevents a gas- and/or liquid flow in an undesired direction between these three different chambers.

BRIEF DESCRIPTION OF THE DRAWINGS

The invention is described in the following with reference to the accompanying drawing, which shows an apparatus intended for freeing crankcase gas from particles of oil and possible solids.

DETAILED DESCRIPTION OF THE PREFERRED EMBODIMENTS

Figure 1:
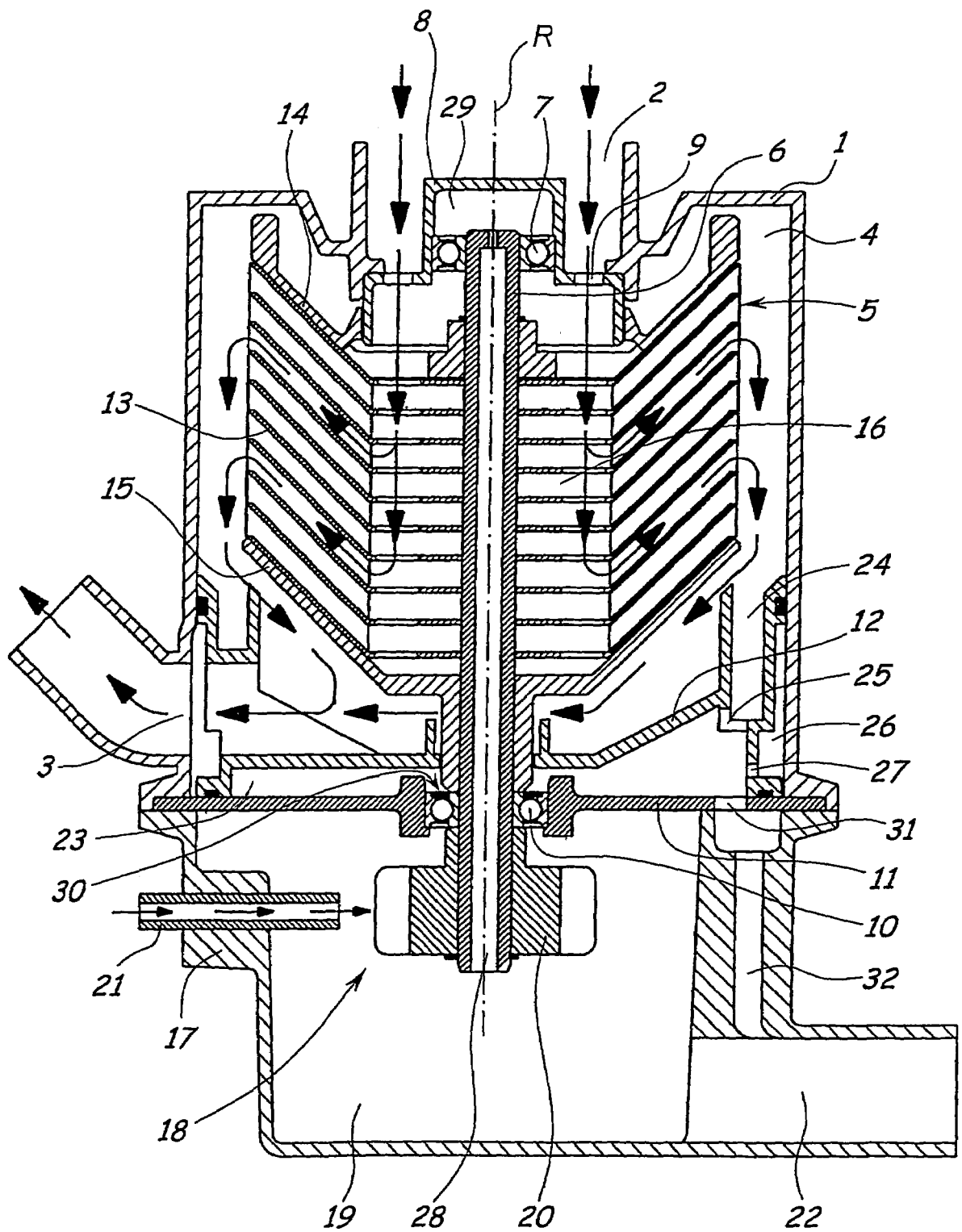

The apparatus in the drawing has a housing 1 provided with an inlet 2 at the top for incoming gas to be cleaned and an outlet 3 on one of its sides for gas having been cleaned. The outlet 3, as shown, may be connected to an outlet conduit extending upwards or obliquely upwards outside the housing 1. Within the housing 1 a separation chamber 4 is delimited, and in this chamber a centrifugal rotor 5 is arranged to rotate about a vertical rotational axis R.

The centrifugal rotor 5 has a central, vertical, hollow shaft 6, which at its upper end is journalled by a ball bearing 7 in a cap 8, which is supported by the upper part of the housing 1. Several through going holes 9 in the cap 8 connect the inlet 2 of the housing with a central part of the centrifugal rotor interior. At its lower end the shaft 6 is journalled by means of a ball bearing 10 in a lower partition 11, which is connected with the housing 1. An upper partition 12 situated between the lower partition 11 and the centrifugal rotor 5 is also connected with the housing 1 and forms together with the lower partition 11 a bottom in the separation chamber 4. The centrifugal rotor 5 also comprises a stack of frusto-conical separation discs 13 supported by the shaft 6. The stack of separation discs 13 is arranged axially between an upper end disc 14 and a lower end disc 15. Between the separation discs there are spacing members of a conventional kind for the formation of flow paths between adjacent separation discs for the gas to be cleaned. As can be seen in the drawing, each separation disc 13 has a central plane portion having a hole for the shaft 6 and several further holes distributed around the shaft 6. The further holes in the separation disc 13 and the interspaces between the central, plane portions of the separation discs 13 form together a central inlet chamber 16 in the centrifugal rotor, which communicates through the holes 9 in the cap 8 with the housing inlet 2 for gas to be cleaned and also communicates through the flow paths between the separation discs 13 with the part of the separation chamber 4 surrounding the centrifugal rotor 5. This part of the separation chamber communicates in turn with the housing outlet 3 for gas having been cleaned.

The housing 1 rests on a base 17 surrounding a driving device 18 for the centrifugal rotor 5. As can be seen in the drawing, the base 17 and the aforementioned lower partition 11 delimit a drive chamber 19. The centrifugal rotor shaft 6, extending from above downwardly through the hole of the housing 1 and through both of the partitions 11 and 12 down into the drive chamber 19, supports in the latter a turbine wheel 20. A pipe or nozzle 21 extends through a surrounding wall of the base 17 into the drive chamber 19 and is arranged to direct a jet of liquid against the turbine wheel 20 for rotation thereof and thereby the centrifugal rotor 5. An outlet channel 22 leads from the drive chamber 19 and is intended for conducting a way liquid having been used for the driving of the centrifugal rotor 5.

The partitions 11 and 12 delimit between themselves a space 23, which extends about the centrifugal rotor shaft 6 and which in the following will be named "drainage chamber". The main object of this drainage chamber 23 is to prevent driving liquid in the drive chamber 19 from being unintentionally pressed upwardly to the separation chamber 4. The drainage chamber 23 is also used to receive, and to forward to an outlet, liquid having been separated in the separation chamber 4 from gas supplied thereto. It is also used for a further object, which shall be explained later.

For receiving liquid separated from the gas in the separation chamber 4 the upper partition 12 forms an annular groove 24 that extends around the lower part of the surrounding wall of the housing 1. At least one outlet 25 at the bottom of the groove leads to the drainage chamber 23. Around the groove 24, between this and the surrounding wall of the housing 1, an annular space 26 is delimited, communicating with the outlet 3 of the housing 1 for cleaned gas. From this space 26 at least one further outlet 27 leads to the drainage chamber 23.

The centrifugal rotor shaft 6 has an axially through going channel 28 that can conduct a mist of liquid from the drive chamber 19 to a small chamber 29 delimited within the cap 8 above the shaft 6. Mist of this kind is used for lubrication of the upper bearing 7. For limiting the amount of mist that may flow to the bearing 7 the shaft 6 supports at its upper part a disc or the like, forming a throttle of the channel 28. Mist having entered the chamber 29 flows further through the bearing 7 into the centrifugal rotor and is mixed therein with entering gas to be cleaned.

The lower bearing 10 is of a kind having on its upper side an annular cover dish 30 arranged to bridge the distance between the outer non-rotatable bearing ring and the inner rotatable bearing ring of the bearing. The cover dish 30 prevents a free flow of liquid mist from the drive chamber 19 into the drainage chamber 23 but cannot completely prevent such a flow, particularly after sometime of wear.

The drainage chamber 23 has at least one liquid outlet 31, which opens into a channel 32 formed in the base 17. The channel 32 in turn opens into the outlet channel 22 in the base 17, which conducts liquid out of the drive chamber 19.

The cleaning device shown in the drawing operates in the following way in connection with cleaning of crankcase gas coming from an internal combustion engine, the crankcase of which (not shown) is connected to the inlet of the apparatus at the upper part of the housing 1. A branch conduit from the circuit for pressurized lubricant oil of the combustion engine is connected to the nozzle 21, and the outlet channel 22 is connected to a return conduit for returning lubricating oil from the drive chamber 19 to said crankcase.

When lubricating oil is sprayed at a high pressure through the nozzle 21 against the turbine wheel 20, so that this is caused to rotate about the rotational axis R, an oil mist is generated in the drive chamber 19 and oil splashes in all directions therein. Upon the resulting rotation of the centrifugal rotor 5 gas therein is caused to rotate, thereby being pumped outwardly through the flow paths between the separation discs 13. Thereby a partial vacuum will come up in the central inlet chamber 16 of the centrifugal rotor, whereby crankcase gas is sucked in to the rotor and is forced to flow through the centrifugal rotor under rotation. The crankcase gas contains suspended particles in the form of oil and soot particles, and in the flow paths between the separations discs 13 these particles are separated from the gas by action of the centrifugal force. While the crankcase gas is pumped out into the separation chamber 4 around the centrifugal rotor and further out through the gas outlet 3 of the housing, the particles deposit on the upwardly facing sides of the separation discs 13, on which they move further slide or run radially outwardly and are finally thrown away from the separation discs towards the surrounding wall of the housing 1. Separated oil (with particles suspended therein) runs along the surrounding wall down into the groove 24 and further through the outlet 25 therefrom into the drainage chamber 23. From the drainage chamber 23 the oil runs further out through the outlet 31 to the channel 32 and from there further to the channel 22 and eventually back to the crankcase of the combustion engine.

After some time of operation it may happen, if the cleaned crankcase gas leaving the housing 1 through the outlet 3 has not been 100% free of oil mist, that some drop of oil now and then runs back from the outlet conduit into the lower part of the separation chamber 4. Such oil enters the annular space 26, from where its runs further through the outlet 27 into the drainage chamber 23 and from there further out thereof through the outlet 31. The outlet 27 from the space 26 can also be regarded as a throttle inlet to the drainage chamber 23, and an inlet of this kind may alternatively be situated so that oil may run directly from said outlet conduit to the drainage chamber without passing through the lower part of the separation chamber 4.

Oil that is sprayed in the drive chamber 19 against the turbine wheel 20 and splashes towards the bearing 10 may partly pass through the bearing and up into the drainage chamber 23. Here oil of this kind runs by itself to the outlet 31 and is returned therethrough and through the channels 32 and 22 to the crankcase of the combustion engine.

As mentioned previously, the centrifugal rotor 5 accomplishes that gas is pumped radially outwardly from the central inlet chamber 16 to the surrounding part of the separation chamber 4. By this a certain over-pressure is generated in the separation chamber 4 around the centrifugal rotor. This over-pressure normally exceeds the gas pressure prevailing in the drive chamber 19. By suitable throttling of the outlets 25, 27 and 31 for oil it is possible during the operation of the apparatus to accomplish a gas pressure in the drainage chamber, which lies between the gas pressure in the separation chamber 4 and the gas pressure in the drive chamber 19. A pressure difference of this kind between the various chambers is advantageous, since it counteracts an undesired flow of liquid or liquid mist from the drive chamber 19 to the drainage chamber 23 and/or from the drainage chamber 23 to the separation chamber 4. Hereby, it can be avoided in the safest possible way that cleaned gas, which is to leave the separation chamber through the outlet 3, is contaminated by liquid used for driving of the centrifugal rotor.

As can be seen in the drawing, the annular groove 24 is situated so that possible oil drops leaving the separation discs 13 at a very slow rotation of the centrifugal rotor fall down into the groove 24 instead of falling on the bottom of the separation chamber 4, from where they would otherwise more easily be entrained by cleaned gas out through the outlet 3. In order to make it even more difficult for liquid to move from the drainage chamber 23 up into the separation chamber 4 the upper partition 12 on its upper side carries around the shaft 6 a cylindrical sleeve. If desired, a lip gasket or the like may be arranged between the upper partition 12 and the part of the centrifugal rotor 5 extending through this partition.

The invention has been described above in connection with a centrifugal rotor, the driving device of which comprises a so-called impulse turbine. However, the invention can be used irrespective of which driving device that is used for driving of the centrifugal rotor and that generates liquid splashing and a liquid mist in the drive chamber. For instance, the drive shaft of the centrifugal rotor may alternatively support for its rotation a reaction turbine that is arranged to be charged (e.g. through the drive shaft) with a pressurized driving liquid, which is caused to leave the reaction turbine through at least one nozzle that is situated at a distance from the rotational axis of the centrifugal rotor and is directed tangentially in the relation thereto.

What is claimed is:

1. An apparatus for cleaning of a gas, comprising:
   a housing, delimiting a separation chamber having a gas inlet for gas to be cleaned and a gas outlet for cleaned gas,
   a centrifugal rotor arranged to rotate about a substantially vertical rotational axis (R) in the separation chamber and to entrain in its rotation gas to be cleaned,
   a drive shaft for rotation of the centrifugal rotor, which drive shaft extends downwardly from the centrifugal rotor through a bottom in the separation chamber and into a drive chamber situated below the bottom, and
   a driving device for rotation of the drive shaft and thereby the centrifugal rotor, which driving device is arranged to generate one or more jets of a liquid in the drive chamber for accomplishing said rotation of the drive shaft,
   said bottom delimiting a drainage chamber in an area, in which the drive shaft extends through the bottom, the drainage chamber being situated so that it will receive liquid that unintentionally flows upwardly from the drive chamber along the drive shaft, and
   the drainage chamber having a liquid outlet for draining of liquid.

2. An apparatus according to claim 1, in which the bottom comprises an upper wall and a lower wall, the drainage chamber being delimited between the upper wall and the lower wall.

3. An apparatus according to claim 1, wherein the liquid outlet from the drainage chamber opens into a space other than the drive chamber.

4. An apparatus according to claim 3, wherein the liquid outlet from the drainage chamber opens into an outlet channel from the drive chamber.

5. An apparatus according to claim 2, wherein a bearing is arranged between the drive shaft and said lower wall.

6. An apparatus according to claim 1, wherein a lower part of the separation chamber communicates with the drainage chamber through a throttled passage, through which liquid separated from said gas is allowed to run from the separation chamber into the drainage chamber.

7. An apparatus according to claim 1, wherein the gas outlet from the separation chamber communicates with the interior of a gas outlet conduit, which extends upwardly from the gas outlet, the drainage chamber having a throttled liquid inlet so situated that liquid drops running downwardly in the gas outlet conduit will reach the throttled liquid inlet.

8. An apparatus according to claim 1, wherein the driving device comprises a turbine member, supported by the drive shaft in the drive chamber, and a spray member arranged to spray liquid against the turbine member in the drive chamber for rotation of the drive shaft and thereby the centrifugal rotor.

* * * * *